(12) United States Patent
Mongeon et al.

(10) Patent No.: US 7,593,130 B2
(45) Date of Patent: Sep. 22, 2009

(54) PRINTING SYSTEMS (75) Inventors: Michael C. Mongeon, Walworth, NY (US); Nancy B. Goodman, Webster, NY (US); Dale R. Mashtare, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 876 days.

(21) Appl. No.: 11/109,996

(22) Filed: Apr. 20, 2005

(65) Prior Publication Data

US 2006/0238778 A1    Oct. 26, 2006

(51) Int. Cl.
   *G06F 1/00* (2006.01)
   *G06F 3/12* (2006.01)
(52) U.S. Cl. .......................... 358/1.4; 358/1.13; 399/49
(58) Field of Classification Search ................. 358/1.4, 358/1.13; 399/49
   See application file for complete search history.

(56) References Cited

U.S. PATENT DOCUMENTS

| | | | |
|---|---|---|---|
| 4,579,466 A | 4/1986 | Sato |
| 4,587,532 A | 5/1986 | Asano |
| 4,836,119 A | 6/1989 | Siraco |
| 5,004,222 A | 4/1991 | Dobashi |
| 5,080,340 A | 1/1992 | Hacknauer |
| 5,095,342 A | 3/1992 | Farrell |
| 5,159,395 A | 10/1992 | Farrell |
| 5,208,640 A | 5/1993 | Horie |
| 5,272,511 A | 12/1993 | Conrad |
| 5,326,093 A | 7/1994 | Sollitt |
| 5,389,969 A | 2/1995 | Suzuki |
| 5,435,544 A | 7/1995 | Mandel |
| 5,473,419 A | 12/1995 | Russel |
| 5,504,568 A | 4/1996 | Saraswat |
| 5,525,031 A | 6/1996 | Fox |
| 5,557,367 A | 9/1996 | Yang |
| 5,568,246 A | 10/1996 | Keller |
| 5,570,172 A | 10/1996 | Acquaviva |
| 5,596,416 A | 1/1997 | Barry |
| 5,629,762 A | 5/1997 | Mahoney |
| 5,710,968 A | 1/1998 | Clark |
| 5,778,377 A | 7/1998 | Marlin |
| 5,884,910 A | 3/1999 | Mandel |
| 5,995,721 A | 11/1999 | Rourke |
| 6,059,284 A | 5/2000 | Wolf |
| 6,125,248 A | 9/2000 | Moser |
| 6,241,242 B1 | 6/2001 | Munro |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Twyler L Haskins
*Assistant Examiner*—Huo Long Chen
(74) *Attorney, Agent, or Firm*—Fay Sharpe LLP (57) ABSTRACT

Measurements are taken of a first parameter associated with a first marking engine and of a second parameter associated with a second marking engine. The first and second measurements are compared to predetermined first and second reference values. An engine-to-engine difference is determined by calculating a difference between the first measured parameter and the second measured parameter. The difference values are compared to corresponding predetermined threshold values. Based on the comparison, a system controller selects a mode of operation of the document processing system.

18 Claims, 9 Drawing Sheets

U.S. PATENT DOCUMENTS

| | | |
|---|---|---|
| 6,297,886 B1 | 10/2001 | Cornell |
| 6,337,958 B1 * | 1/2002 | Stanich et al. ................. 399/49 |
| 6,341,773 B1 | 1/2002 | Aprato et al. |
| 6,384,918 B1 | 5/2002 | Hubble, III |
| 6,450,711 B1 | 9/2002 | Conrow |
| 6,476,376 B1 | 11/2002 | Biegelsen |
| 6,476,923 B1 | 11/2002 | Cornell |
| 6,493,098 B1 | 12/2002 | Cornell |
| 6,537,910 B1 | 3/2003 | Burke |
| 6,550,762 B2 | 4/2003 | Stoll |
| 6,554,276 B2 | 4/2003 | Jackson |
| 6,577,925 B1 | 6/2003 | Fromherz |
| 6,607,320 B2 | 8/2003 | Bobrow |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon |
| 6,633,382 B2 | 10/2003 | Hubble, III |
| 6,639,669 B2 | 10/2003 | Hubble, III |
| 6,819,906 B1 | 11/2004 | Herrmann |
| 7,162,172 B2 * | 1/2007 | Grace et al. ................. 399/49 |
| 7,382,993 B2 * | 6/2008 | Mongeon et al. ............. 399/49 |
| 2002/0078012 A1 | 6/2002 | Ryan |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz |
| 2004/0150158 A1 | 8/2004 | Biegelsen |
| 2004/0153983 A1 | 8/2004 | McMillan |
| 2004/0216002 A1 | 10/2004 | Fromherz |
| 2004/0225391 A1 | 11/2004 | Fromherz |
| 2004/0225394 A1 | 11/2004 | Fromherz |
| 2004/0247365 A1 | 12/2004 | Lofthus et al. |
| 2005/0088710 A1 * | 4/2005 | Nakayama ................. 358/518 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/002,528, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.

* cited by examiner

PRINTING SYSTEMS

CROSS REFERENCE TO RELATED APPLICATIONS

The following applications, the disclosures of each being totally incorporated herein by reference are mentioned:

U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. Provisional Application Ser. No. 60/631,656, filed Nov. 30, 2004, entitled "Multi-Purpose Media Transport Having Integral Image Quality Sensing CAPABILITY," by Steven R. Moore;

U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," by David G. Anderson et al.;

U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE," by David G. Anderson et al.;

U.S. application Ser. No. 10/761,522, filed Jan. 21, 2004, entitled "HIGH RATE PRINT MERGING AND FINISHING SYSTEM FOR PARALLEL PRINTING," by Barry P. Mandel, et al.;

U.S. application Ser, No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;.

U.S. application Ser. No. 10/860,195, filed Aug. 23, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/881,619, filed Jun. 30, 2004, entitled "FLEXIBLE PAPER PATH USING MULTIDIRECTIONAL PATH MODULES," by Daniel G. Bobrow.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, for PRINTING SYSTEM WITH HORIZONTAL HIGHWAY AND SINGLE PASS DUPLEX by Lofthus, et al.;

U.S. application Ser. No. 10/924,113, filed Aug. 23, 2004, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004 for PRINT SEQUENCE SCHEDULING FOR RELIABILITY by Robert M. Lofthus, et al.;

U.S. patent application Ser. No. 10/924,459, filed Aug. 23, 2004, entitled "PARALLEL PRINTING ARCHITECTURE USING IMAGE MARKING DEVICE MODULES," by Barry P. Mandel, et al;

U.S. patent application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. patent application Ser. No. 10/999,450, filed Nov. 30, 2004, entitled "ADDRESSABLE FUSING FOR AN INTEGRATED PRINTING SYSTEM," by Robert M. Lofthus, et al.;

U.S. patent application Ser. No. 11/000,158, filed Nov. 30, 2004, entitled "GLOSSING SYSTEM FOR USE IN A TIPP ARCHITECTURE," by Bryan J. Roof;

U.S. patent application Ser. No. 11/000,168, filed Nov. 30, 2004, entitled "ADDRESSABLE FUSING AND HEATING METHODS AND APPARATUS," by David K. Biegelsen, et al.;

U.S. patent application Ser. No. 11/000,258, filed Nov. 30, 2004, entitled "GLOSSING SYSTEM FOR USE IN A TIPP ARCHITECTURE," by Bryan J. Roof;

U.S. application Ser. No. 11/001,890, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/002,528, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/051,817, filed Feb. 4, 2005, entitled "PRINTING SYSTEMS," by Steven R. Moore, et al.;

U.S. application Ser. No. 11/069,020, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "MULTI-PURPOSE MEDIA TRANSPORT HAVING INTEGRAL IMAGE QUALITY SENSING CAPABILITY," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/089,854, filed Mar. 25, 2005, entitled "SHEET REGISTRATION WITHIN A MEDIA INVERTER," by Robert A. Clark et al.;

U.S. application Ser. No. 11/090,498, filed Mar. 25, 2005, entitled "INVERTER WITH RETURN/BYPASS PAPER PATH," by Robert A. Clark;

U.S. application Ser. No. 11/090,502, filed Mar. 25, 2005, entitled "IMAGE QUALITY CONTROL METHOD AND APPARATUS FOR MULTIPLE MARKING ENGINE SYSTEMS," by Michael C. Mongeon;

U.S. application Ser. No. 11/093,229, filed Mar. 29, 2005, entitled "PRINTING SYSTEM," by Paul C. Julien;

U.S. application Ser. No. 11/095,872, filed Mar. 31, 2005, entitled "PRINTING SYSTEM," by Paul C. Julien;

U.S. application Ser. No. 11/094,864, filed Mar. 31, 2005, entitled "PRINTING SYSTEM," by Jeremy C. deJong, et al.;

U.S. application Ser. No. 11/095,378, filed Mar. 31, 2005, entitled "IMAGE ON PAPER REGISTRATION ALIGNMENT," by Steven R. Moore, et al.; and U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.

BACKGROUND

The present exemplary embodiment relates to printing systems. It finds particular application in conjunction with maintaining image quality in print or marking systems with multiple electrophotographic or xerographic print engines. However, it is to be appreciated that the present exemplary embodiment is also amenable to other like applications.

Typically, in image rendering or printing systems, it is desirable that a rendered, or printed, image closely match, or have similar aspects or characteristics to a desired target or input image. However, many factors, such as temperature, humidity, ink or toner age, and/or component wear, tend to move the output of a printing system away from the ideal or target output. For example, in xerographic marking engines, system component tolerances and drifts, as well as environmental disturbances, may tend to move an engine response away from an ideal, desired or target engine response and toward an engine response that yields images that are lighter or darker than desired.

Some document processing systems include a plurality of integrated marking engines. In some systems, each integrated marking engine (IME) includes sensors and control loops for maintaining or directing one or more integrated marking engines processes at or toward some ideal or target. For instance, some electro-photographic systems include a hierarchical control scheme. An exemplary electro-photographic system includes level one control loops for maintaining electro-photographic actuators at set points, level two control loops for selecting set points for the level one control loops and level three controls for compensating for residual differences between actual and target values of aspects of the electro-photographic process.

Such controls can provide excellent quality and consistency within the production of an individual engine source. However, differences in sensors, toners or colorants, temperatures, humidities and other parameters and aspects of engine sources can lead to variations between what is produced by a first engine source and what is produced by a second engine source. Variations between the outputs of two or more engine sources can be completely acceptable where entire production runs are produced by a single engine source. However, when component parts of a single product are produced by different engine sources, print to print variations can be problematic.

For example, where a document processor includes two or more integrated marking engines, marking engine to marking engine variations can be perceived as consistency or quality issues. For instance, where facing pages in a booklet are rendered by different print engines, slight variations in registration, gray scale or color between the facing pages can be perceived as a defect, even though when considered separately, the pages would be considered to be of high quality.

One solution to improve engine-to-engine print quality or consistency is to implement evermore sophisticated sensors and control algorithms within individual marking engines. However, such solutions are expensive in both research and development costs and hardware implementations delivered to customers.

There is a need for methods and apparatuses that overcome the aforementioned problems and others.

REFERENCES

U.S. Pat. No. 4,710,785, which issued Dec. 1, 1987 to Mills, entitled PROCESS CONTROL FOR ELECTROSTATIC MACHINE, discusses an electrostatic machine having at least one adjustable process control parameter.

U.S. Pat. No. 5,510,896, which issued Apr. 23, 1996 to Wafler, entitled AUTOMATIC COPY QUALITY CORRECTION AND CALIBRATION, discloses a digital copier that includes an automatic copy quality correction and calibration method that corrects a first component of the copier using a known test original before attempting to correct other components that may be affected by the first component.

U.S. Pat. No. 5,884,118, which issued Mar. 16, 1999 to Mestha, entitled PRINTER HAVING PRINT OUTPUT LINKED TO SCANNER INPUT FOR AUTOMATIC IMAGE ADJUSTMENT, discloses an imaging machine having operating components including an input scanner for providing images on copy sheets and a copy sheet path connected to the input scanner.

U.S. Pat. No. 6,418,281, which issued Jul. 9, 2002 to Ohki, entitled IMAGE PROCESSING APPARATUS HAVING CALIBRATION FOR IMAGE EXPOSURE OUTPUT, discusses a method wherein a first calibration operation is preformed in which a predetermined grayscale pattern is formed on a recording paper and this pattern is read by a reading device to produce a LUT for controlling the laser output in accordance with the image signal (gamma correction).

However, the aforementioned patents are not concerned with methods for improving, achieving, or maintaining image quality between or among a plurality of marking engines.

BRIEF DESCRIPTION

According to one aspect, a method for image process control in a document processing system which includes marking engines is disclosed. A first parameter associated with a first marking engine is measured. A second parameter associated with a second marking engine is measured. A first difference between the first measured parameter and a first reference value is determined. A second difference between the second measured parameter and a second reference value is determined. A third difference between the first measured parameter and second measured parameter is determined. The first, second and third differences are compared to corresponding predetermined first, second and third threshold values. Based on the comparison, a mode of operation of the document processing system is established.

According to another aspect, a document processing system is disclosed. The document processing system comprises a first marking system which includes a first marking engine. A first sensor measures a first parameter associated with the first marking system. A first actuator adjusts the first marking engine. A first marking engine controller is in operative communication with the first actuator and controls the first actuator. The document processing system further comprises a second marking system which includes a second marking engine. A second sensor measures a second parameter associated with the second marking system. A second actuator adjusts the second marking engine. A second marking engine controller adjusts the second actuator. A system controller is in operative communication with the first and second marking engine controllers and controls the first and second marking engines to maintain an image quality adjustment process based on the first and second measured parameters.

DETAILED DESCRIPTION

Figure 1:
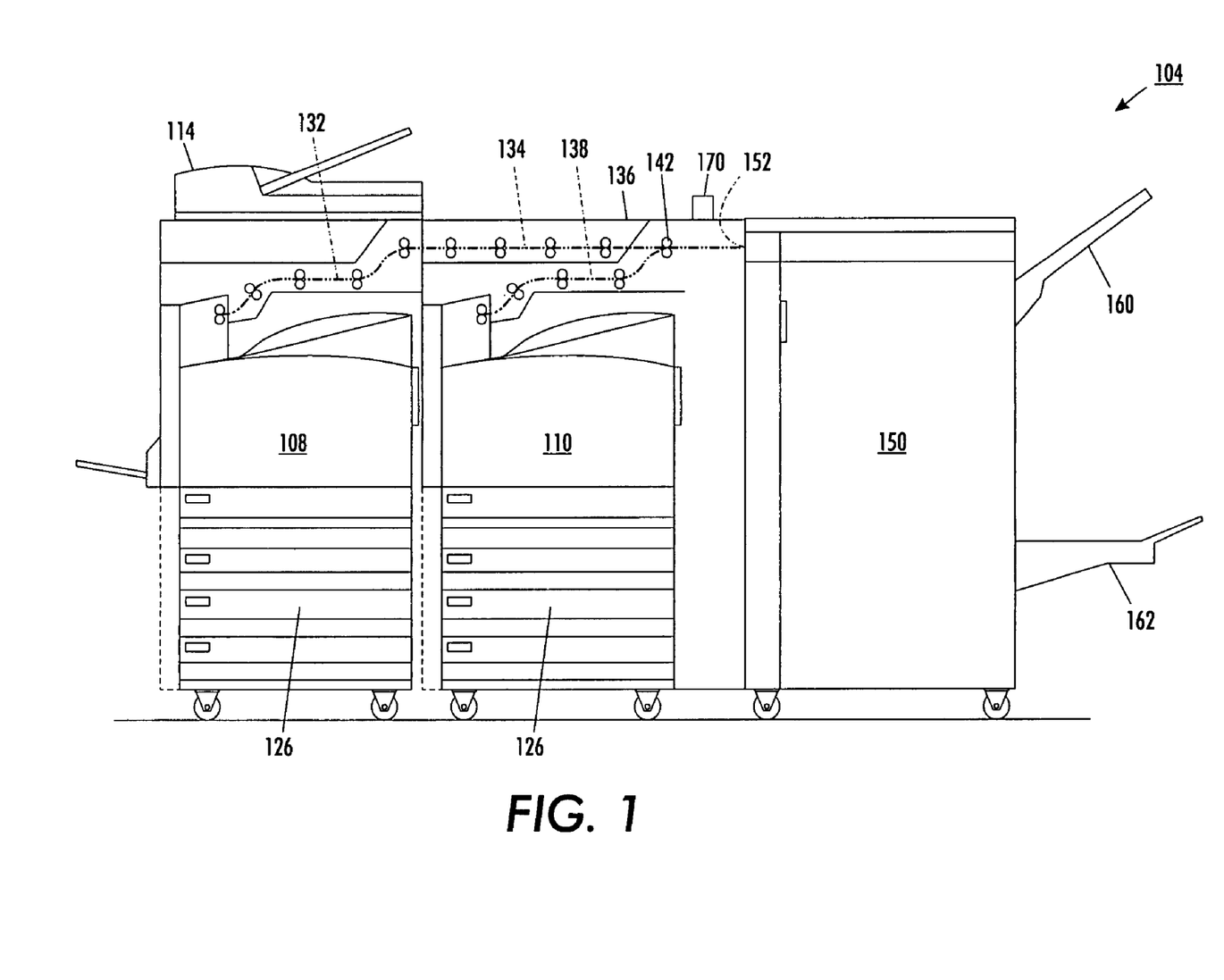
FIG. 1 is a view of a document processing system which includes marking engines.

With reference to FIG. 1, an image or document processing system 104, that might incorporate embodiments of the methods and systems disclosed herein, includes a first image output terminal (IOT) 108, a second image output terminal 110, and an image input device 114, such as a scanner, imaging camera or other device. Although only two output terminals are illustrated, it is contemplated that the document processing system can include a plurality of output terminals. Each image output terminal 108, 110 includes a plurality of input media trays 126 and an integrated marking engine as will be discussed in a greater detail below. The first image output terminal 108 may support the image input device 114 and includes a first portion 132 of a first output path. A second portion 134 of the first output path is provided by a bypass module 136. The second image output terminal 110 includes a first portion 138 of a second output path. A third portion of the first path and a second portion of the second path begin at a final nip 142 of the second image output terminal 110 and includes an input to a finisher 150.

The finisher 150 includes, for example, first 160 and second 162 main job output trays. Depending on a document processing job description and on the capabilities of the finisher 150, one or both of the main job output trays 160, 162 may collect loose pages or sheets, stapled or otherwise bound booklets, shrink wrapped assemblies or otherwise finished documents. The finisher 150 receives sheets or pages from one or both of the image output terminals 108, 110 via an input 152 and processes the pages according to a job description associated with the pages or sheets and according to the capabilities of the finisher 150.

Figure 2:
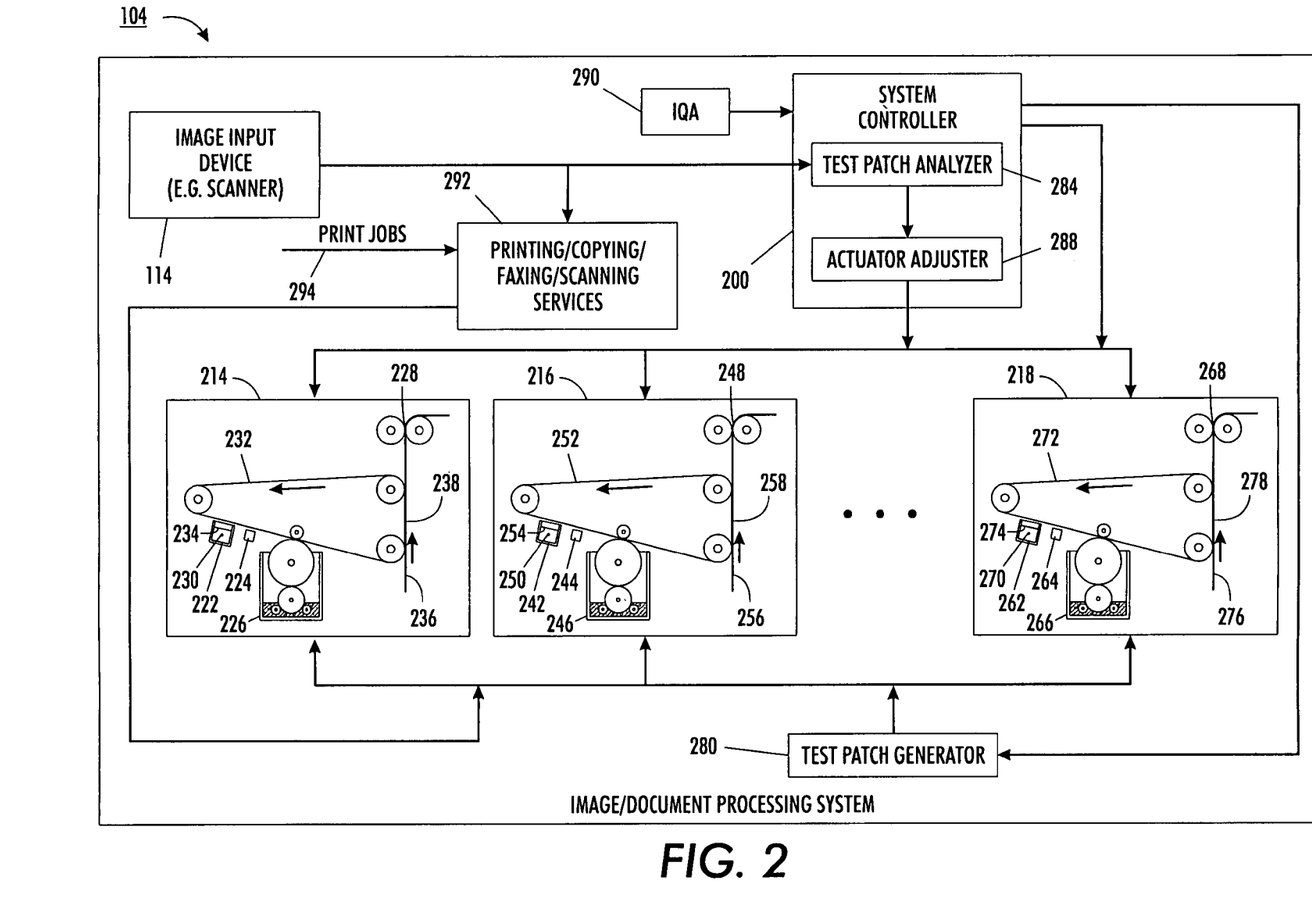
FIG. 2 is a block diagram of the document processing system which includes multiple marking engines.

With continuing reference to FIG. 1 and further reference to FIG. 2, a system controller 200 controls the production of printed or rendered pages, the transportation over the path elements 132, 134, 138, 148 and 152, and the collation and assembly as job output by the finisher 150. The produced, printed or rendered pages may include images transferred to the document processing system via a telephone communications network, a computer network, computer media, and/or images entered through the image input device 114. For example, rendered or printed pages or sheets may include images received via facsimile, transferred to the document processing system from a word processing, spreadsheet, presentation, photo editing or other image generating software, transferred to the document processor 104 over a computer network or on a computer media, such as a CD ROM, memory card or floppy disc, or may include images generated by the image input device 114 of scanned or photographed pages or objects. The images can be transferred, manually or automatically, to the image input device 114 to generate computer readable representations of the rendered images. On an occasional, periodic, or as needed or requested basis, the controller 200 may generate, print or render test, diagnostic or calibration sheets or pages. Such test, diagnostic or calibration sheets may be transferred, manually or automatically, to the image input device 114, which can be used to generate computer readable representations of the rendered test images. The computer readable representations may then be analyzed by the controller, or some auxiliary device, to determine image consistency information, and, if necessary, adjust some aspect of the image rendering system in a manner predetermined or known to make an improvement in, or achieve, image consistency. For example, electrophotographic, xerographic, or other rendering technology actuators may be adjusted. Alternatively, image path data may be manipulated to compensate or correct for some aspect of the rendering or marking process based on the analysis of the computer readable representations of the test images.

With continuing reference to FIGS. 1 and 2, the image or document processing system 104 includes a plurality of print or marking engines, each of which is associated with a respective output terminal. For example, the plurality of marking or print engines includes first, second, . . . , $n^{th}$ xerographic marking or print engines 214, 216, . . . , 218. For simplicity, the xerographic marking engines 214, 216, . . . , 218 are illustrated as monochrome (e.g., black and white) marking engines. However, other embodiments including color marking engines are also contemplated. Furthermore, embodiments including marking engines of other technologies are also contemplated.

Each marking technology is associated with marking technology actuators. For example, the first xerographic marking engine 214 includes a charging element 222, a writing element 224, a developer 226 and a fuser 228, which each can be associated with one or more xerographic actuators.

For instance, the charging element 222 may be a corotron, a scorotron, or a dicorotron. In each of these devices, a voltage is applied to a coronode (wire or pins) 230 to ionize surrounding air molecules, which in turn causes a charge to be applied to a photoconductive belt 232 or drum. Where the charging element 222 is a scorotron, the scorotron includes a grid 234, to which a grid voltage is applied. The scorotron grid 234 is located between the coronode 230 and the photoconductor 232 and helps to control the charge strength and uniformity of the charge applied to the photoconductor 232. The coronode voltage and the grid voltage are xerographic actuators. Changing either voltage may result in a change in the charge applied to the photoconductor 232, which in turn may affect an amount of toner attracted to the photoconductor 232 and therefore the lightness or darkness of a printed or rendered image. Many xerographic marking engines include one or more electrostatic volt meters (ESV) for measuring the charge applied to the photoconductor 232. In such systems, a control loop receives information from the ESV and adjusts one or both of the coronode voltage and the grid voltage in order to maintain a desired ESV measurement.

In one embodiment, the writing element 224 is a raster output scanner (ROS). Typically, a raster output scanner includes a laser, and a polygonal arrangement of mirrors, which is driven by a motor to rotate. A beam of light from the laser is aimed at the mirrors. As the arrangement of mirrors rotates, a reflected beam scans across a surface of the photoconductor 232. The beam is modulated on and off. As a result, portions of the photoconductor 232 are discharged. Alternatively, the ROS includes one or more light emitting diodes (LEDs). For instance, an array of LEDs may be positioned over respective portions of the photoconductor 232. Lighting an LED tends to discharge the photoconductor at positions associated with the lit LED. ROS exposure is a xerographic actuator. For example, the exposure, or amount of light that reaches the photoconductor 232, is a function of ROS power and/or ROS exposure time. The higher the laser or LED power, the more discharged associated portions of the photoconductor 232 become. Alternatively, the longer a particular portion of the photoconductor 232 is exposed to laser or LED light, the more discharged the portion becomes. The degree, to which the portions of the photoconductor 232 are charged or discharged, affects the amount of toner that is attracted to the photoconductor 232. Adjusting ROS exposure adjusts the lightness of a rendered or printed image.

The developer 226 includes a reservoir of toner. The concentration of toner in the reservoir has an effect on the amount of toner attracted to charge portions of the photoconductor 232. For instance, the higher the concentration of toner in the reservoir, the more toner is attracted to portions of the photoconductor 232. E.g., toner concentration in the reservoir is a xerographic actuator. Toner concentration can be controlled by controlling the rate at which toner from a toner supply is delivered to the developer toner reservoir.

With continuing reference to FIG. 2, print media, such as sheets of paper or velum, is transported on a media transport 236, while toner on the photoconductor 232 is transferred to the media at a transfer point 238. The print media is transported to the fuser 228 where elevated temperatures and pressures operate to fuse the toner to the print media. Pressures and temperatures of the fuser 228 are xerographic actuators.

Other xerographic actuators such as a carriage adjustment actuator, a paper path actuator, a media path actuator, and other actuators are also known. Additionally, other printing technologies include actuators that can be adjusted to control the lightness or darkness of the printed or rendered image. For example, in ink jet based marking engines, a drop ejection voltage controls an amount of ink propelled toward print media with each writing pulse. Therefore, drop ejection voltage is a factor in an ink jet actuator.

The second and $n^{th}$ xerographic print engines $216, \ldots, 218$ include elements similar to the first xerographic marking engine 214 such as a charging element 242, 262, a writing element 244, 264, a developer 246, 266, a fuser 248, 268, a coronode 250, 270 and a photoconductor 252, 272. The charging element may include a charging grid 254, 274. A media transport 256, 276 carries print media to a transfer point 258, 278 and to the fuser 248, 268.

In one embodiment, a test patch generator 280, an analyzer 284, an actuator adjuster or actuator adjusting algorithm 288 and two or more print or marking engines $214, 216, \ldots, 218$, cooperate to perform one or more methods which control image quality. In one embodiment, the analyzer 284 and actuator adjuster 288 are embodied in software which is run by a controller 200. Alternatively, one or more of the analyzer 284, and actuator adjuster 288 are implemented in hardware, which is supervised by the controller 200.

If the document processing system 104 drifts out of process control parameters, the customer may initiate an Image Quality Adjustment procedure or algorithm 290 which results in a scanner based tone reproduction curve (TRC) adjustment. For instance, the test patch generator 280 is operative to control each of the plurality of xerographic print engines to generate a printed version of a midtone test patch. The printed version of the midtone test patch from each of the plurality of print engines is delivered, manually or automatically, to the image input device 114 which operates to generate a computer readable representation of the printed midtone test patch. The test patch analyzer 284 is operative to analyze computer readable versions of the plurality of test patches, generated by the image input device 212. Additionally, the test patch analyzer is operative to determine an amount at least one xerographic actuator should be adjusted based on the analysis. The actuator adjuster 288 is operative to adjust the at least one xerographic actuator according to the amount determined by the test patch analyzer 284. The test patch generator 280, test patch analyzer 284, and actuator adjuster 288 are included as a means for controlling or adjusting image quality in the print job production.

For instance, a main function of the image input device 114 is to generate computer readable representations or versions of imaged items, such as, a printed sheet or a collection of printed sheets, so that copies of the imaged item or items can be printed or rendered by one or more of the plurality of marking engines. In addition to the copying services, the document or image processing system 104 may provide printing, faxing and/or scanning services 292. For example, print job descriptions 294 may be received by the image or document processing system 104 over a computer network or on computer readable media. Additionally, print jobs 294 may include incoming or received facsimile transmissions. The printing, copying, faxing, scanning services 292 of the image or document processing system 204 initiate one or more of the first 214, second 216, and/or $n^{th}$ 218 printing or marking engines to produce the print jobs 294.

In the multi-engine systems, tone reproduction is specified differently than it is specified in the single-engine system. The system TRC is specified to be the same with the same variation allowed as the single-engine case, but there is a unique and tighter constraint with an engine-to-engine L* variation. This means the engines are allowed to drift together within a somewhat large tolerance band as long as the inter-engine TRC variation is met.

Figure 3:
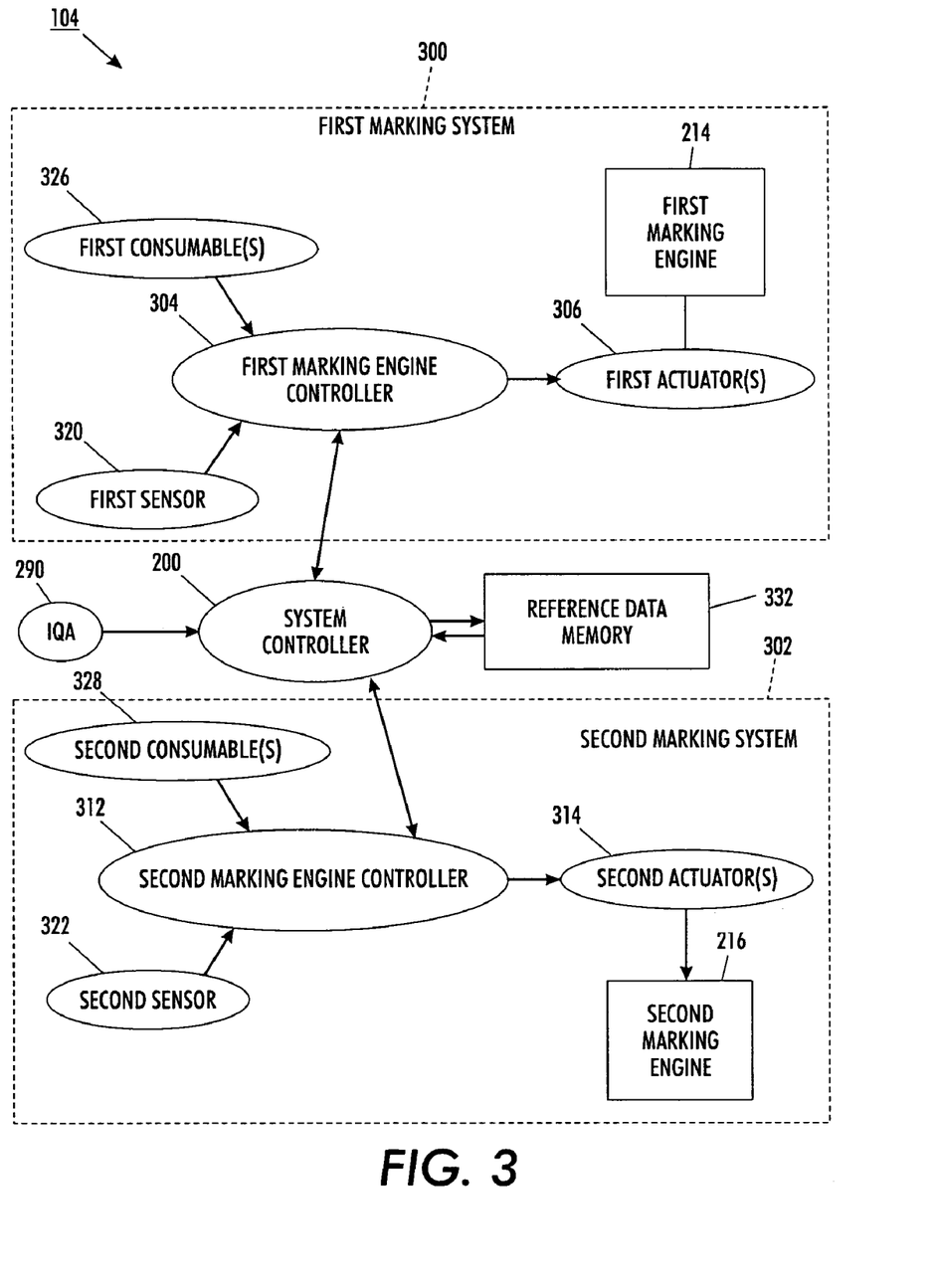
FIG. 3 is a block diagram of the document processing system.

With reference to FIG. 3, the system controller 200 supervises or controls first and second marking systems 300, 302 to maintain and/or adjust quality control in the document processing system 104. More specifically, the first marking system 300 includes a first marking engine controller 304 which is in operative communication with the system controller 200, and first marking process actuators 306. The second marking system 302 includes a second marking engine controller 312 which is in operative communication with the system controller 200 and second marking process actuators 314. First and second marking system sensors 320, 322 are in operative communication with corresponding first and second marking engine controllers 304, 312. The first and second sensors 320, 322 are mounted, for example, adjacent the paper path 132, 134, 138, 148, 152 to examine, study or measure various aspects of the printed sheets delivered to the path elements 132, 142, 144, 148, 152. In another example, the first and second sensors 320, 322 may be positioned adjacent some other portion of the first and second marking system 300, 302. The sensors 320, 322 may be located within a single zone of the corresponding first and second marking system 300, 302 or distributed throughout the corresponding first and second marking system 300, 302 adjacent one or more paper paths. Although the exemplary first and second sensors 320, 322 are illustrated as single sensors, it is contemplated that each sensor can include any number of sensors for any aspect of the marking systems 300, 302 to be sensed by one of the sensors 320, 322. The first and second sensors 320, 322 can be the same type sensors or different type sensors. For example, the sensors 320, 322 can be at least one of an environmental sensor, a temperature sensor, a relative humidity sensor, a thermistor, an electrostatic voltage sensor, a voltage sensor, a current sensor, a paper path sensor, a test page analyzer, a toner concentration sensor, a densitometer, a toner area coverage sensor, a color sensor, a gloss sensor, a calorimeter, a spectrophotometer, a light sensor, a photo detector, a charge coupled device sensor, a streaking sensor, a banding sensor, a mottle sensor, a registration sensor, a bi-cell registration sensor, a scanner, a scan bar, a full width charge coupled device sensor, and any other appropriate sensor.

The first and second marking system 300, 302 include associated first and second marking system consumables 326, 328. For example, the consumables can be photoreceptor age, developer age, customer replacement items, and the like. The first and second sensors 320, 322 and first and second consumables 326, 328 provide input to the first and second marking systems 300, 302, based on which the system controller 200 selects one of quality control schemes or mechanisms or processes to maintain a prespecified quality criteria of the document processing system 104. Further, the system controller 200 establishes the document processing system 104 mode of operation. For example, the mode of operation can be normal operation, degraded normal operation, extended normal operation, or a disable mode as discussed below. The actuator adjusting algorithm 288 converts the sensor input to an actuator output, e.g. the process control algorithm outputs actuator levels to adjust or maintain the printing process within the prespecified quality control criteria.

Figure 4:
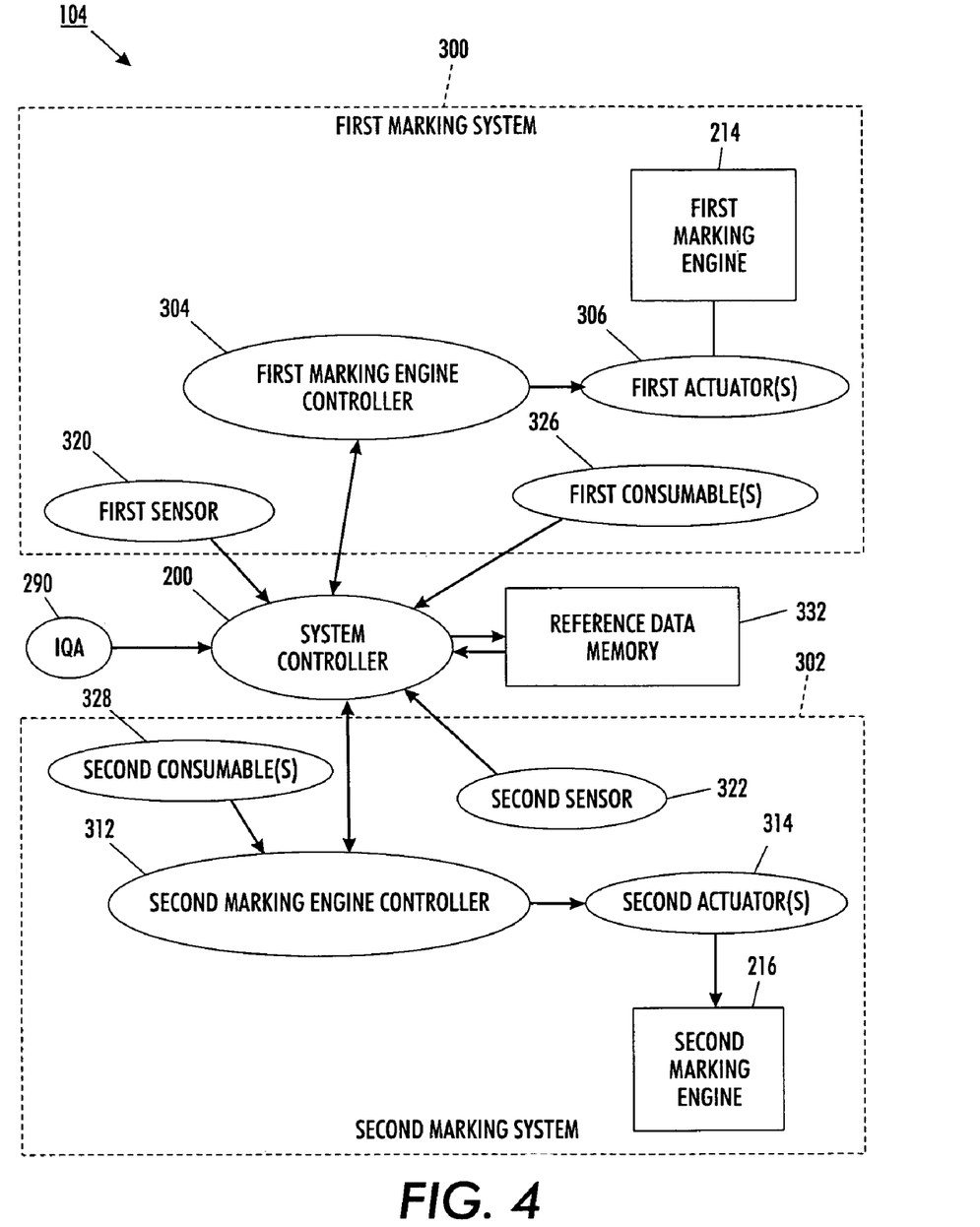
FIG. 4 is a block diagram of another embodiment of the document processing system.

With reference to FIG. 4, the system controller 200 centrally supervises or controls the first and second marking systems 300, 302. The first and second marking system sensors 320, 322 provide direct inputs to the system controller 200. The first and second marking system consumables 326, 328 provide direct inputs to the system controller 200. The system controller 200 is in operative communication with the first and second marking engine controllers 304, 312. Based on the input provided by the first and second marking system sensors 320, 322 and first and second consumables 326, 328, the system controller 200 selects one of quality control processes and establishes the mode of operation of the document processing system as discussed below. More specifically, the system controller 200 provides output commands or actuator levels to the first and second marking engines controllers 304, 312, which, in turn, adjust the corresponding first and second marking engines 214, 216 by a use of the first and second actuators 306, 314. In this manner, the sensors and the consumables inputs are used to control the printing process of the document printing system 104.

Figure 5:
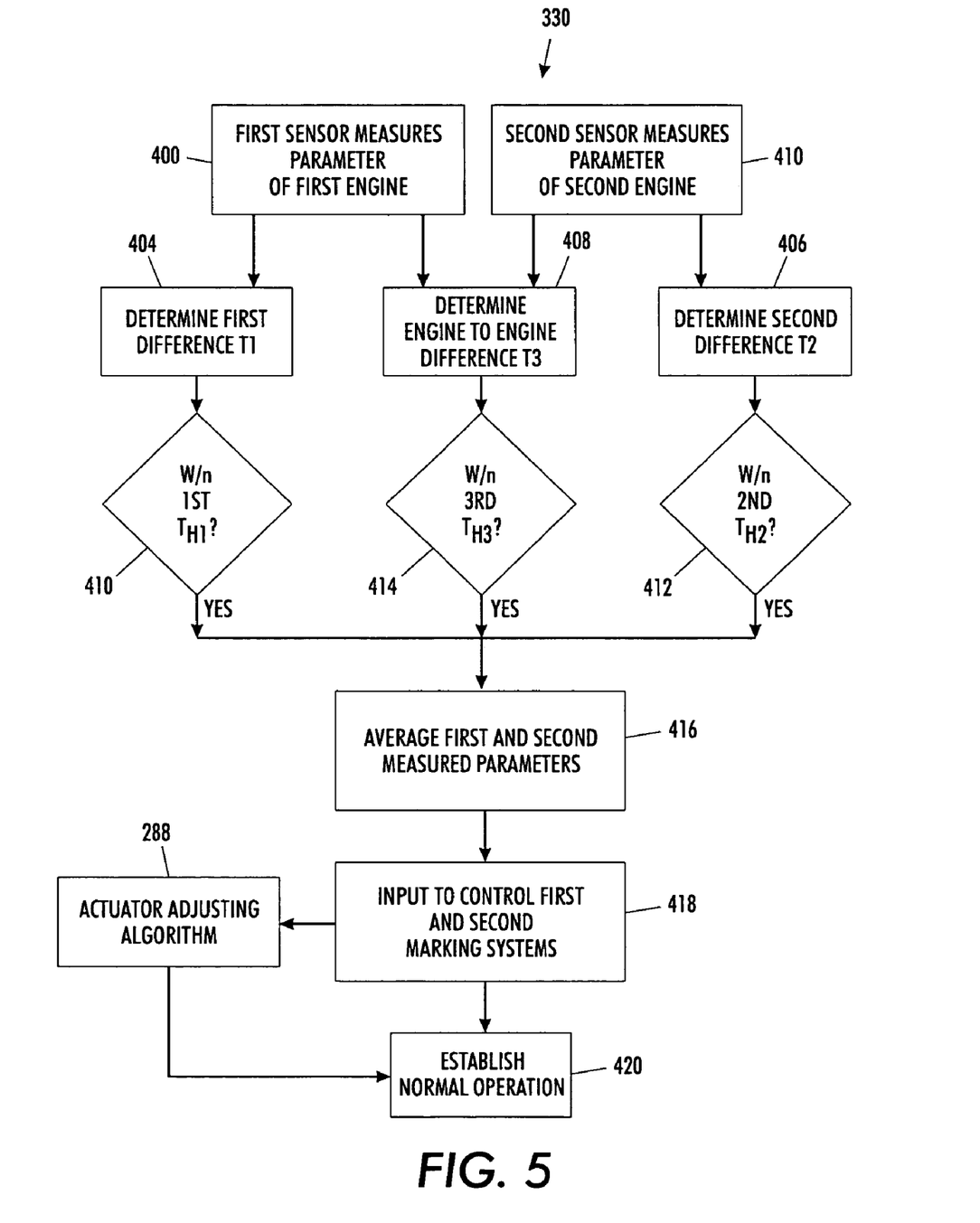
FIG. 5 is a flow chart of a portion of an image quality control approach.
Figure 6:
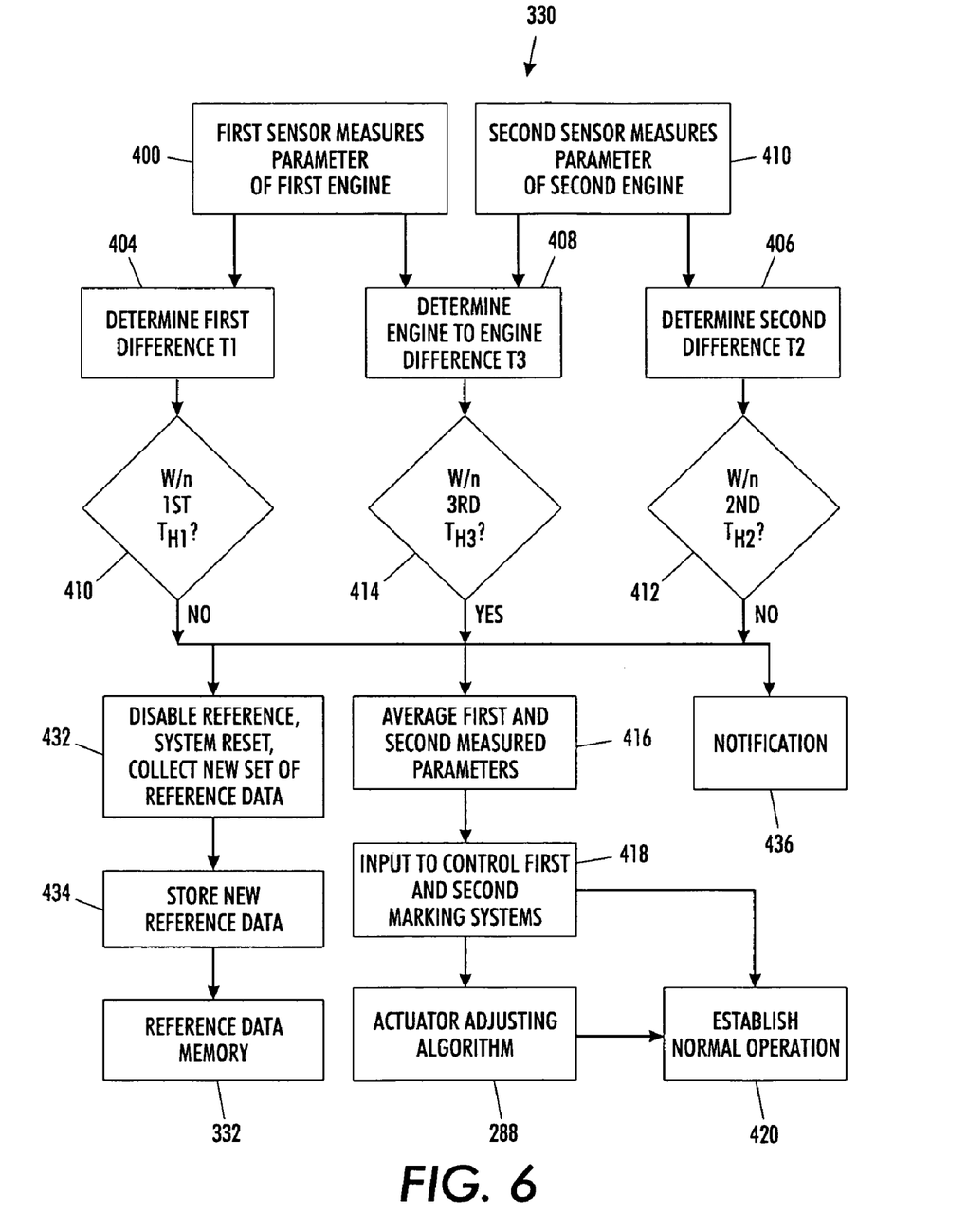
FIG. 6 is a flow chart of another portion of an image quality control approach.
Figure 7:
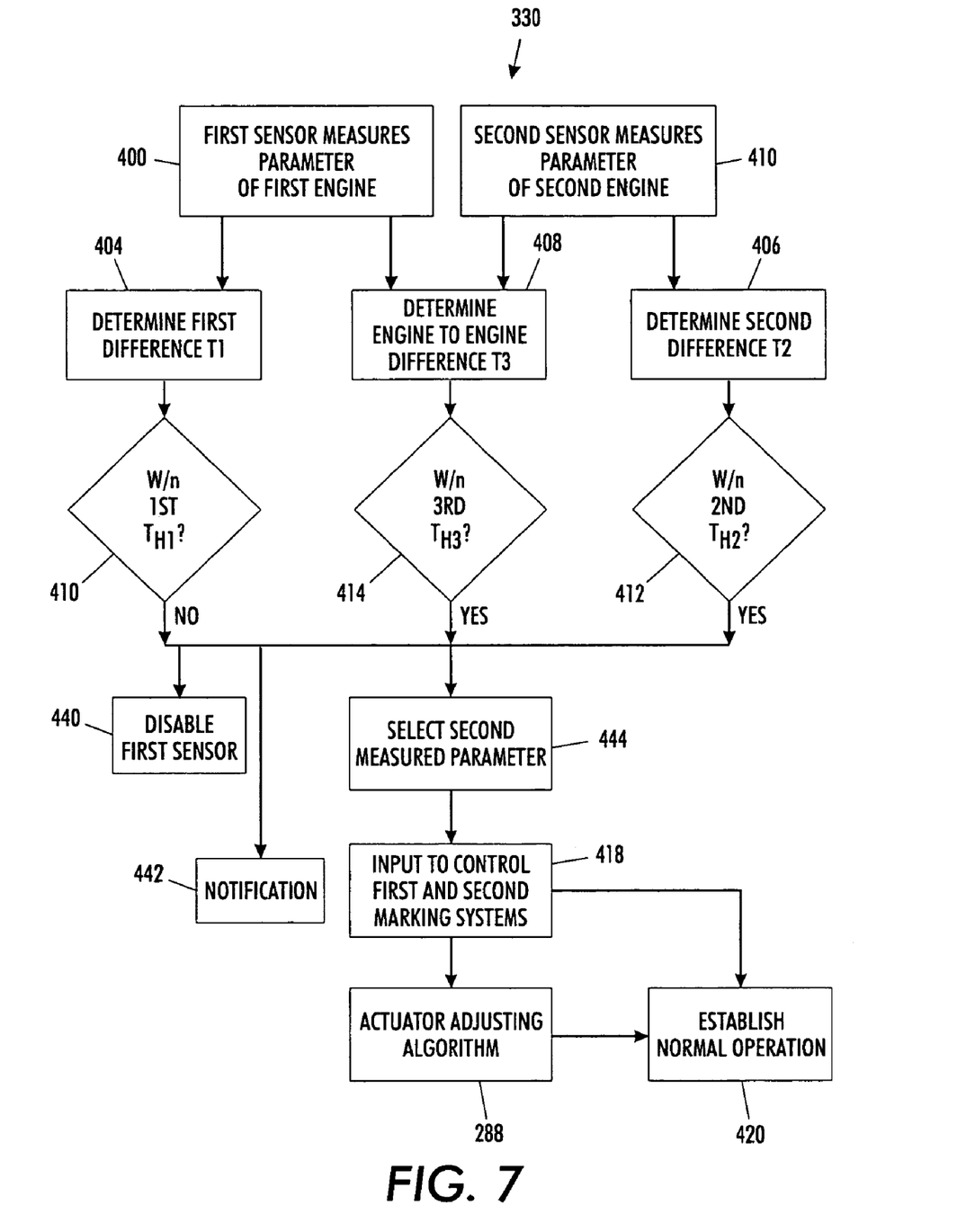
FIG. 7 is a flow chart of another portion of an image quality control approach.
Figure 8:
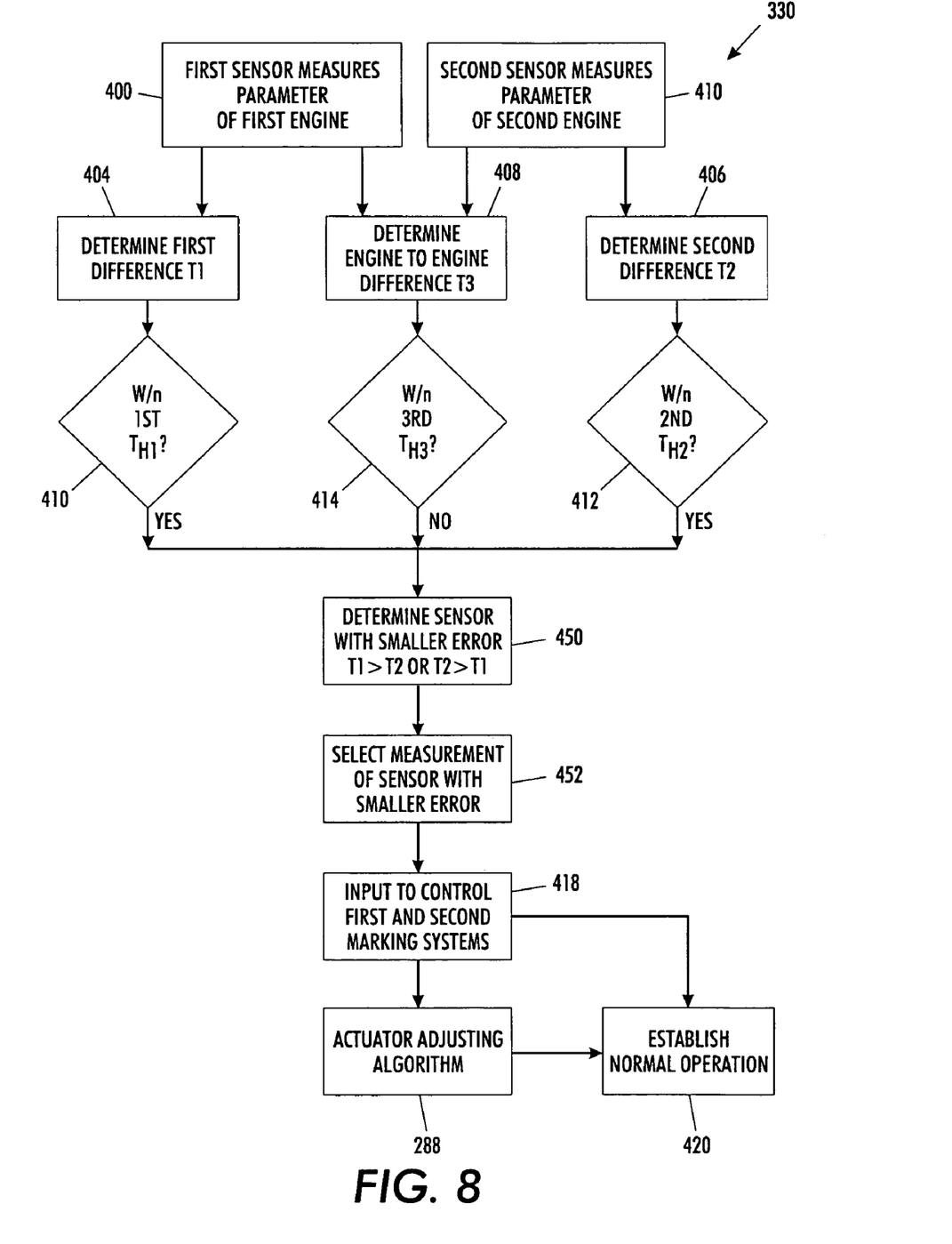
FIG. 8 is a flow chart of another portion of an image quality control approach.

With continuing reference to FIGS. 3-4 and further reference to FIGS. 5-8, a redundant quality control process or approach 330 is illustrated to control image quality in the document processing system 104 in which the first and second sensors 320, 322 are similar type sensors and the marking engines 214, 216, . . . ,218 experience a constant environment, e.g. the first and second consumables 326, 328 provide substantially similar or same inputs. In the multi-engine systems, the multi-engine redundancies can be used to enable improved system reliability and image quality stability. The system is managed at a higher level, which includes treating individual engine controllers as sub-systems in the central control scheme. For example, such redundant sensors can measure same parameter such as, for example, temperature. The parameters of the first and second marking systems 300, 302 measured by the first and second sensors 320, 322 may differ by a known amount as the difference in measurements is predictable from the system architecture. The system develops knowledge from the marking engine systems, which enables unique comparative control algorithms. A knowledge base or a reference data memory 332 is built at system level characterizing the state of the engines relative to nominal and relative to one another as discussed below. For example, each engine 214, 216, . . . ,218, has the environmental first and second sensors 320, 322 which sample temperature and humidity. A more robust environmental sensor input is obtained and provided to the multi-engine document processing system. The input data from the first and second engines 214, 216 and historical data are stored in the reference data memory 332 and used as reference values in the actuator adjusting algorithm 288. More specifically, a first parameter or aspect A of the first marking engine 214 is measured 400 with the first sensor 320. A second parameter or aspect B of the second marking engine 216 is measured 402 with the second sensor 322. The first measured parameter A of the first marking engine 214 is compared 404 to a first reference value REF1 to receive a first engine delta value or error T1:

$T1 = A - REF1$, where

T1 is the first engine delta value;
A is the measured first parameter of the first marking engine; and
REF1 is the first reference value.

The second measured parameter B of the second engine 216 is compared 406 to a second reference value REF2 to receive a second engine delta value T2:

$T2 = B - REF2$, where

T2 is the second engine delta value;
B is the second measured parameter of the second marking engine; and
REF2 is the second reference value.

The first and second measured parameters A, B of each engine 214, 216 are compared 408 to one another to receive an engine-to-engine difference or a third delta value T3:

$T3 = A - B$, where

T3 is an engine-to-engine delta difference;
A is the first measured parameter of the first engine; and
B is the second measured parameter of the second engine.

The determined first, second and third delta values T1, T2, T3 are compared 410, 412, 414 to corresponding predetermined first, second and third threshold values $T_{H1}$, $T_{H2}$, $T_{H3}$.

With continuing reference to FIG. 5, the determined first, second and third delta values T1, T2, T3 are equal to or less than the corresponding first, second and third threshold values $T_{H1}$, $T_{H2}$, $T_{H3}$. The first and second measured parameters A, B are averaged 416. The averaged measurement of the first and second sensors 320, 322 is provided as an input 418 to the actuator adjusting algorithm 288 to control the first and second marking systems 300, 302. E.g., the normal operation of the document processing system 104 continues 420 with a result of averaging as a control measure.

With reference again to FIG. 6, the first and second delta values T1, T2 of the corresponding first and second marking engines 214, 216 are larger than the corresponding first and second threshold values $T_{H1}$, $T_{H2}$. This indicates that (1) both first and second sensors 320, 322 are faulty, or (2) the reference data is possibly corrupted. The first and second measured parameters A, B of the first and second engines 214, 216 are averaged 416. The averaged value is provided 418 as an input to the actuator adjusting algorithm 288 to control the operation of the first and second marking systems 300, 302. E.g., the normal mode of operation continues 420 with the averaged measurement as the control measure. The reference data is disabled, system is reset and the collection of a new set of reference data is initiated 432. For example, the system can be reset to the averaged measurement or to a default value. The new reference data is stored 434 in the reference data memory 332. A notification 436 is sent to inform the service personnel of the possible faulty condition of the first and second sensors 320, 322.

With reference again to FIG. 7, one of the measured first and second parameters A, B is greater than the corresponding first and second threshold values $T_{H1}$, $T_{H2}$. This indicates that one of the first and second sensors 320, 322 is faulty. The faulty sensor is disabled 440, and the user is notified 442 about the faulty condition of one of the sensors 320, 322. The parameter measured by a non-faulty sensor is selected 444 to provide an input 418 to the actuator adjusting algorithm 288 to control the operation of the first and second marking systems 300, 302. The operation of the document processing system 104 continues in the normal mode of operation with the measurement of the non-faulty sensor as the control measure.

With reference again to FIG. 8, the first and second engine delta values T1, T2 are equal to or less than the corresponding first and second threshold values $T_{H1}$, $T_{H2}$. The third delta value T3 is greater than the third threshold value $T_{H3}$. This indicates a significant difference between the first and second sensors 320, 322, which, in this embodiment, are redundant sensors. The system compares the first and second delta values T1, T2 to one another to determine which of the first and second sensors has a smaller error as compared to the corresponding reference value REF1, REF2. The measurement of the sensor with the smaller error is selected 452 to provide an input 418 to the actuator adjusting algorithm 288 to control the first and second marking systems 300, 302. Alternatively, the first and second measured parameters A, B are averaged. The averaged value is used as an input 418 to the actuator adjusting algorithm 288 to control the first and second marking systems 300, 302. The document processing system 104 continues operation in the normal mode 420 with the non-faulty sensor measurement and the averaged measurement as the control measure.

Figure 9:
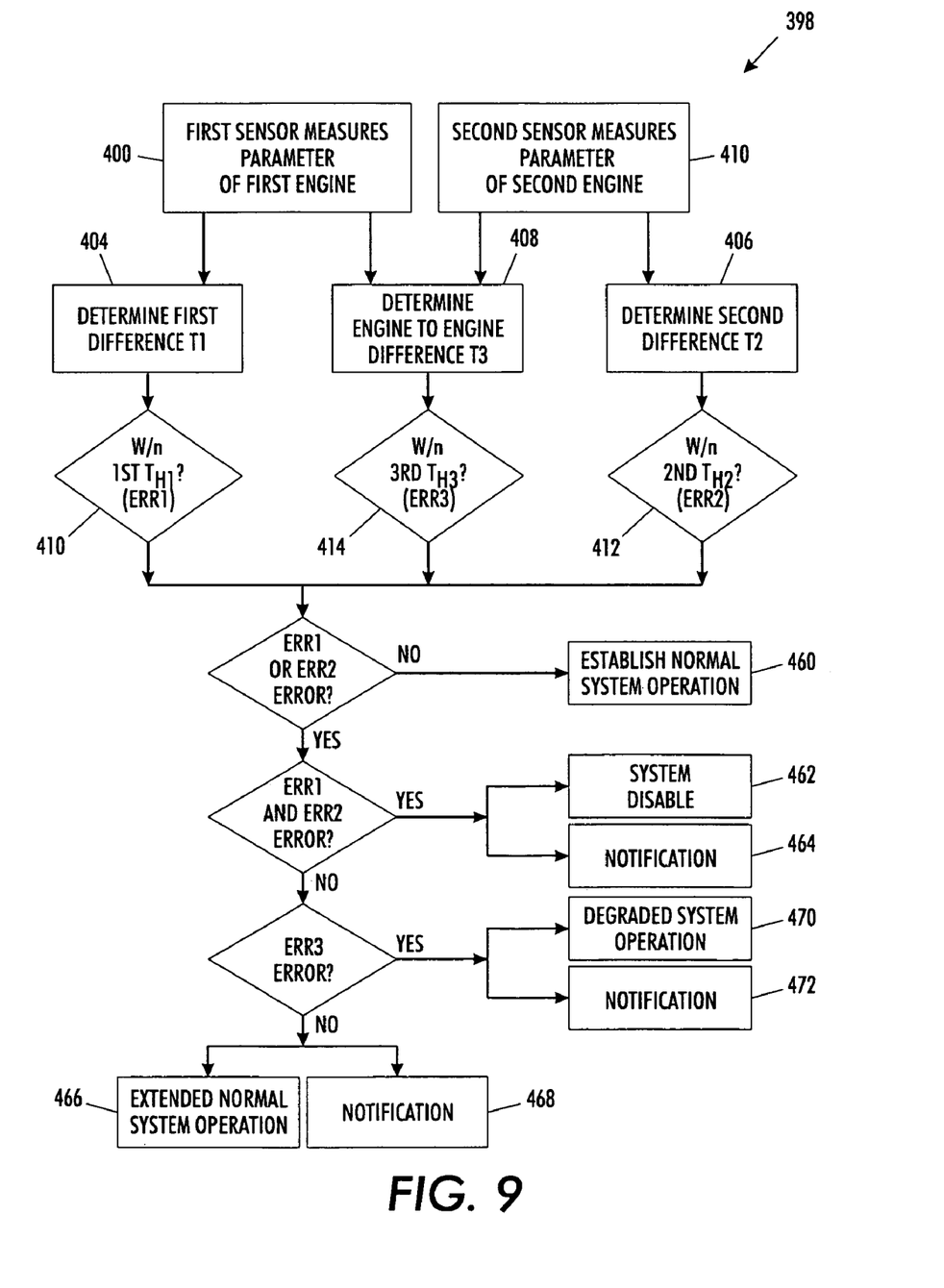
FIG. 9 is a flow chart of another portion of an image quality control approach.

With reference again to FIG. 2 and further reference to FIG. 9, a nonredundant quality control methodology approach or algorithm 398 is illustrated to control the document processing system 104, in which each engine 214, 216, ..., 218 uses non-redundant sensors. Such non-redundant sensors, in one embodiment, can measure similar parameters, e.g. temperature, while the engine-to-engine consumables 326, 328 can change state over time and become substantially dissimilar. In another embodiment, the non-redundant sensors can measure varying parameters, for example, grayscale values of the images produced by the first and second marking engines. The applicability of such non-redundant sensors to the quality control issues is discussed in the examples below.

For example, in a fuser application, the fuser set points are the same for the first and second marking engines 214, 216, but the drive current from the first marking engine fuser 218 is much higher than that of the second marking engine fuser 268 to meet the temperature requirement. Such condition may result in higher gloss product produced by the second engine. The multi-engine systems are more sensitive to fuser temperature variation than single engines, as the document processing system may produce prints with varying gloss within a job. For example, the system controller 200 can communicate the knowledge of the excessive second engine fuser current to the service, such as "Check thermistor for toner accumulation", or "Second Engine Fuser is running at high drive current."

As another example, in a paper path application, when the system leaves the site of manufacture, the system includes new components with maximum roll diameters. As sheets arrive at respective paper path sensors, the lead-edge of the sheet triggers the sensor. Over time, the average arrival times may go outside the tolerance window. For example, the sheet arrival time can be internally captured at each paper path, and the sheet velocity may be tracked. Given this knowledge, the service personnel may be alerted when a given roller or paper path component should be replaced.

As another example, in a ROS application, during the manufacture, the ROS is calibrated to a nominal prespecified level tolerance. As the ROS ages, the exposure set point may increase as the laser diode ages. If the ROS of the first marking engine 214 ages significantly quicker than the ROS of the second, ..., $n^{th}$ marking engines 216, ..., 218, then the system may conclude that the first marking engine 214 has a possible filming or contamination on the aged ROS window, and may direct the service to intervene.

Another ROS application is the possibility of dropping a ROS beam. In a quad-beam ROS, if the sensor exposure measurement shows 25% for a given ROS, this may be an indication of dropping the ROS beam. In this case, the service personnel are instructed to print out the ROS diagnostic pattern to test for this condition.

With continuing reference to FIG. 9, in the quality control process 398, similar to the embodiments of FIGS. 5-8, the first parameter A of the first marking engine 214 is measured 400 with the first sensor 320. The second parameter B of the second marking engine 216 is measured 402 with the second sensor 322. The first measured parameter A of the first marking engine 214 is compared 404 to the first reference value REF1 to receive the first engine delta value T1. The second measured parameter B of the second engine 216 is compared 406 to the second reference value REF2 to receive the second engine delta value T2. The first and second measured parameters A, B of each engine 214, 216 are compared 408 to one another to receive the engine-to-engine difference or the third delta value T3. The determined first, second and third values T1, T2, T3 are compared 410, 412, 414 to corresponding predetermined first, second and third threshold values $T_{H1}$, $T_{H2}$, $T_{H3}$. If the first delta value T1 and the second delta value T2 are equal to or less than the corresponding first and second threshold values $T_{H1}$, $T_{H2}$, the system continues normal system operation 460. If both the first and second delta values $T_{H1}$, $T_{H2}$, are greater than the corresponding first and second threshold values $T_{H1}$, $T_{H2}$, the system is disabled 462. A notification is sent 464 to the user about the faulty condition. If only one of the first and second delta values T1, T2 is greater than one of the corresponding first and second threshold values $T_{H1}$, $T_{H2}$, and the third delta value T3 is equal to or less than the third threshold value $T_{H3}$, the system continues an extended normal system operation 466. The notification is sent 468 to the user about the faulty condition.

In the latter case, if the third delta value T3 is greater than the third threshold value $T_{H3}$, the system performs a degraded system operation 470. A notification 472 is sent to the user about the faulty condition.

The first and second marking engines 214, 216 run independently of one another with periodic image quality adjustments (IQA) procedure 290 initiated by the customer when inter-engine differences exceed pre-set limits or when xerographic replaceable units (XRU) replacement has been performed. The availability of two or more engines allows for improved system performance compared with two independent engines, allowing sensor averaging in some cases, or disabling of faulty sensors in other cases.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method to control a document processing system comprising:
measuring a first parameter associated with a first marking engine;
measuring a second parameter associated with a second marking engine;
determining a first difference between the first measured parameter and a first reference value;
determining a second difference between the second measured parameter and a second reference value;
determining a third difference between the first measured parameter and second measured parameter;
comparing the first, second and third differences to corresponding predetermined first, second and third threshold values;
based on the comparison, wherein the first, second and third differences are each equal to or less than the corresponding first, second and third threshold values, establishing a mode of operation of the document processing system, including continuing normal operation of the document processing system;
averaging the first and second parameter measurements; and
controlling the normal operation of the document processing system with the averaged measurement.

2. A method to control a document processing system comprising:
measuring a first parameter associated with a first marking engine;
measuring a second parameter associated with a second marking engine;
determining a first difference between the first measured parameter and a first reference value;
determining a second difference between the second measured parameter and a second reference value;
determining a third difference between the first measured parameter and second measured parameter;
comparing the first, second and third differences to corresponding predetermined first, second and third threshold values; and
based on the comparison, establishing a mode of operation of the document processing system, including determining first and second consumables' state of corresponding first and second marking engines;
wherein the first and second parameters are measurements of a substantially similar constant property and wherein the first and second consumables' state include substantially similar characteristics;
wherein one of the first and second differences are greater than the corresponding first and second threshold value, and wherein establishing the operation mode further includes at least one of:
disabling the sensor associated with the measured parameter which is greater than the threshold value; and
controlling the normal operation of the document processing system with the measured parameter which is equal to or less than the corresponding threshold value.

3. The method as set forth in claim 2, wherein the first and second differences are greater than the corresponding first and second threshold values, and wherein establishing the operation mode further includes:
resetting the first and second reference values;
averaging the first and second parameter measurements; and
controlling the normal operation of the document processing system with the average of the first and second parameter measurements.

4. The method as set forth in claim 3, further including:
resetting the first and second reference values to at least one of the average of the first and second parameter measurements and a predetermined default value.

5. A method to control a document processing system comprising:
measuring a first parameter associated with a first marking engine;
measuring a second parameter associated with a second marking engine;
determining a first difference between the first measured parameter and a first reference value;
determining a second difference between the second measured parameter and a second reference value;
determining a third difference between the first measured parameter and second measured parameter;
comparing the first, second and third differences to corresponding predetermined first, second and third threshold values; and
based on the comparison, establishing a mode of operation of the document processing system, including determining first and second consumables' state of corresponding first and second marking engines;
wherein the first and second parameters are measurements of a substantially similar constant property and wherein the first and second consumables' state include substantially similar characteristics;
wherein the first and second differences are each equal to or less than the corresponding first and second threshold values and the third difference is greater than the third threshold value, and wherein establishing the operation mode further includes:
continuing normal operation of the document processing system.

6. The method as set forth in claim 5, further including:
averaging the first and second parameter measurements; and
controlling the normal operation of the document processing system with the averaged measurement.

7. The method as set forth in claim 5, further including:
comparing the first and second difference to one another;
based on the comparison, determining which measured parameter has a smaller error; and
controlling the normal operation of the document processing system with one of the first and second parameter measurements which has the smaller error.

8. A method to control a document processing system comprising:
measuring a first parameter associated with a first marking engine;
measuring a second parameter associated with a second marking engine;
determining a first difference between the first measured parameter and a first reference value;
determining a second difference between the second measured parameter and a second reference value;
determining a third difference between the first measured parameter and second measured parameter;
comparing the first, second and third differences to corresponding predetermined first, second and third threshold values; and
based on the comparison, establishing a mode of operation of the document processing system, including determining first and second consumables' state of corresponding first and second marking engines;

wherein the first and second parameters are measurements of one of a substantially similar constant property and a varying property and wherein the first and second consumables' state include at least one dissimilar characteristic wherein at least one of the first and second differences are greater than the corresponding first and second threshold values and the third difference is greater than the third threshold value, and wherein establishing the operation mode further includes:

reporting an error condition;

disabling the operation of one of the first and second marking engines which is associated with one of the first and second difference being greater than the threshold value; and continuing the operation of the remaining marking engine in a degraded system operation mode.

9. The method as set forth claim 8, wherein the first and second differences are greater than the corresponding first and second threshold values, and establishing the operation mode further includes:

reporting an error condition; and disabling the operation of the first and second marking engines.

10. A method to control a document processing system comprising:

measuring a first parameter associated with a first marking engine;

measuring a second parameter associated with a second marking engine;

determining a first difference between the first measured parameter and a first reference value;

determining a second difference between the second measured parameter and a second reference value;

determining a third difference between the first measured parameter and second measured parameter;

comparing the first, second and third differences to corresponding predetermined first, second and third threshold values; and based on the comparison, establishing a mode of operation of the document processing system, including determining first and second consumables' state of corresponding first and second marking engines;

wherein the first and second parameters are measurements of one of a substantially similar constant property and a varying property and wherein the first and second consumables' state include at least one dissimilar characteristic wherein one of the first and second differences are greater than one of the corresponding first and second threshold values and the third difference is equal to or less than the third threshold value, and wherein establishing the operation mode further includes:

continuing the operation of the document processing system in an extended system operation mode.

11. The method as set forth in claim 10, wherein the first and second differences are greater than the corresponding first and second threshold values, and establishing the operation mode further includes:

reporting an error condition; and disabling the operation of the first and second marking engines.

12. A document processing system comprising:

a first marking system including:

a first marking engine, a first sensor for measuring a first parameter associated with the first marking system, a first actuator for adjusting the first marking engine, and a first marking engine controller in operative communication with the first actuator for controlling the first actuator;

a second marking system including:

a second marking engine, a second sensor for measuring a second parameter associated with the second marking system, a second actuator for adjusting the second marking engine, and a second marking engine controller in operative communication with the second actuator for controlling the second actuator; and a system controller in operative communication with the first and second marking engine controllers for controlling the first and second marking engines;

wherein at least one of the first marking engine controller and the system controller is for determining a first difference between the first measured parameter and a first reference value and for comparing the first difference to a predetermined first threshold value;

wherein at least one of the second marking engine controller and the system controller is for determining a second difference between the second measured parameter and a second reference value and for comparing the second difference to a predetermined second threshold value;

wherein at least one of the first marking engine controller, second marking engine controller, and system controller is for determining a third difference between the first measured parameter and the second measured parameter, for comparing the third difference to a predetermined third threshold value, for establishing a mode of operation of the document processing system based on the comparing of the first, second, and third differences are equal to or less than the corresponding first, second, and third threshold values, and, when the first, second, and third differences are equal to or less than the corresponding first, second, and third threshold values, is for averaging the first and second parameter measurements and for continuing normal operation.

13. The system as set forth in claim 12, wherein the first sensor is in communication with at least one of the first marking engine controller and the system controller, and the second sensor is in communication with at least one of the second marking engine controller and the system controller, the first and second sensors providing an input to the system controller, at least based on which, the system controller establishes a mode of operation of the document processing system and selects a control measure.

14. The system as set forth in claim 12, wherein the first and second marking engines are xerographic marking engines.

15. The system as set forth in claim 12, wherein at least one of the first and second sensors include at least one of:

a temperature sensor, a humidity sensor, an input scanner, a toner concentration sensor, and a pixel count sensor.

16. The system as set forth in claim 12, wherein at least one of the first and second actuators include at least one of:

a grid voltage actuator, a laser exposure actuator, a toner concentration set point actuator, and a developer bias actuator.

17. The system as set forth in claim 12 wherein at least one of the first marking engine controller, second marking engine controller, and system controller are for determining first and second consumables' state of corresponding first and second marking engines;
  wherein the first and second parameters are measurements of a substantially similar constant property and wherein the first and second consumables' state include substantially similar characteristics.

18. The system as set forth in claim 12 wherein at least one of the first marking engine controller, second marking engine controller, and system controller are for determining first and second consumables' state of corresponding first and second marking engines;
  wherein the first and second parameters are measurements of one of a substantially similar constant property and a varying property and wherein the first and second consumables' state include at least one dissimilar characteristic.

* * * * *